United States Patent

Lange

[15] 3,683,774

[45] Aug. 15, 1972

[54] PHOTOGRAPHIC CAMERA WITH ELECTRICALLY OPERATED FILM METERING AND TIMING MECHANISM

[72] Inventor: Karl Heinz Lange, Ennigloh, Westphalia, Germany

[73] Assignee: Balda Werke Photographische Gerate und Kunststoff R. Gruter Kommanditgesellschaft, Westphalia, Germany

[22] Filed: July 16, 1970

[21] Appl. No.: 55,515

[30] Foreign Application Priority Data

July 30, 1969 Germany............P 19 38 622.2

[52] U.S. Cl............95/31 FM, 95/31 EL, 95/53 EB, 95/53.3
[51] Int. Cl........G03b 1/62, G03b 17/40, G03b 9/62
[58] Field of Search........................95/31 EL, 31 FM

[56] References Cited

UNITED STATES PATENTS 3,568,584  3/1971  Harvey....................95/31 FM
3,481,261  12/1969  Fischer et al............95/31 FM

FOREIGN PATENTS OR APPLICATIONS 1,156,639  10/1963  Germany................95/31 EL
330,514   6/1958   Switzerland...........95/31 EL

*Primary Examiner*—Samuel S. Matthews
*Assistant Examiner*—Russell E. Adams, Jr.
*Attorney*—Sparrow and Sparrow

[57] ABSTRACT

A photographic camera with a scanner for sensing perforations on a roll of film used for indexing film frames. The scanner has electrical contacts cooperating with a printed circuit board oriented parallel to the motion of the scanner. The contacts perform switching functions to control electrical elements on the camera. Camera exposure and film advance can be interlocked. A lever can be tensioned by depressing an exposure release member. The lever is held by an abutment and released when the lever moves away from the abutment. To take delayed exposures for self-photographs, the lever can be held by a mechanical or electrical timing mechanism for a predetermined time interval after the exposure release member is depressed. The camera parts are preferably made of electrically insulating plastic material through injection molding.

19 Claims, 40 Drawing Figures

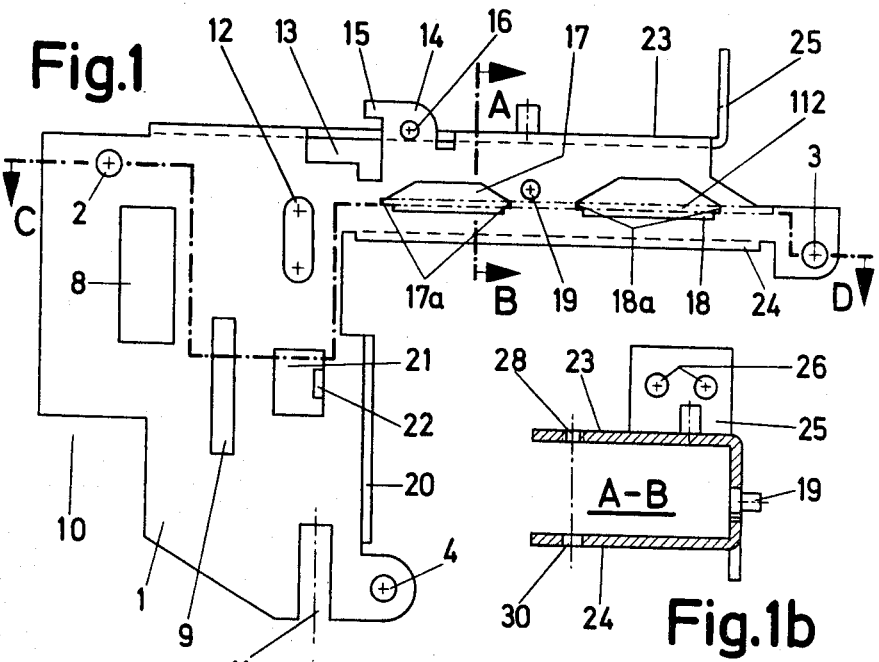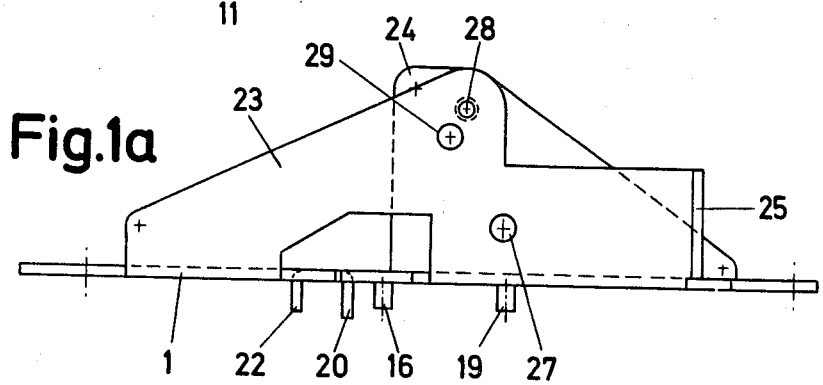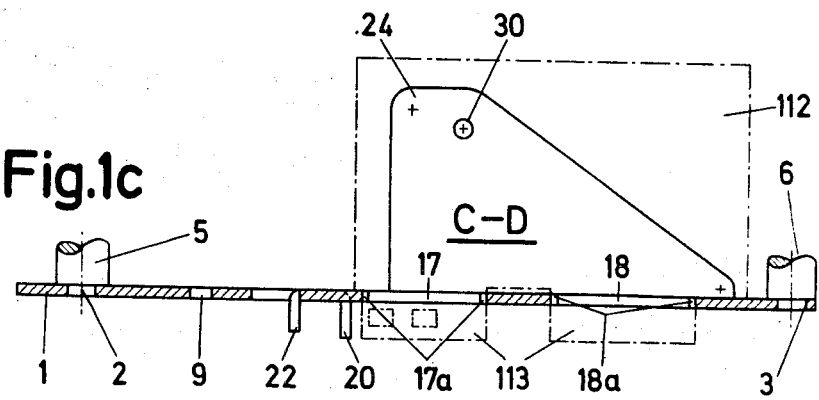

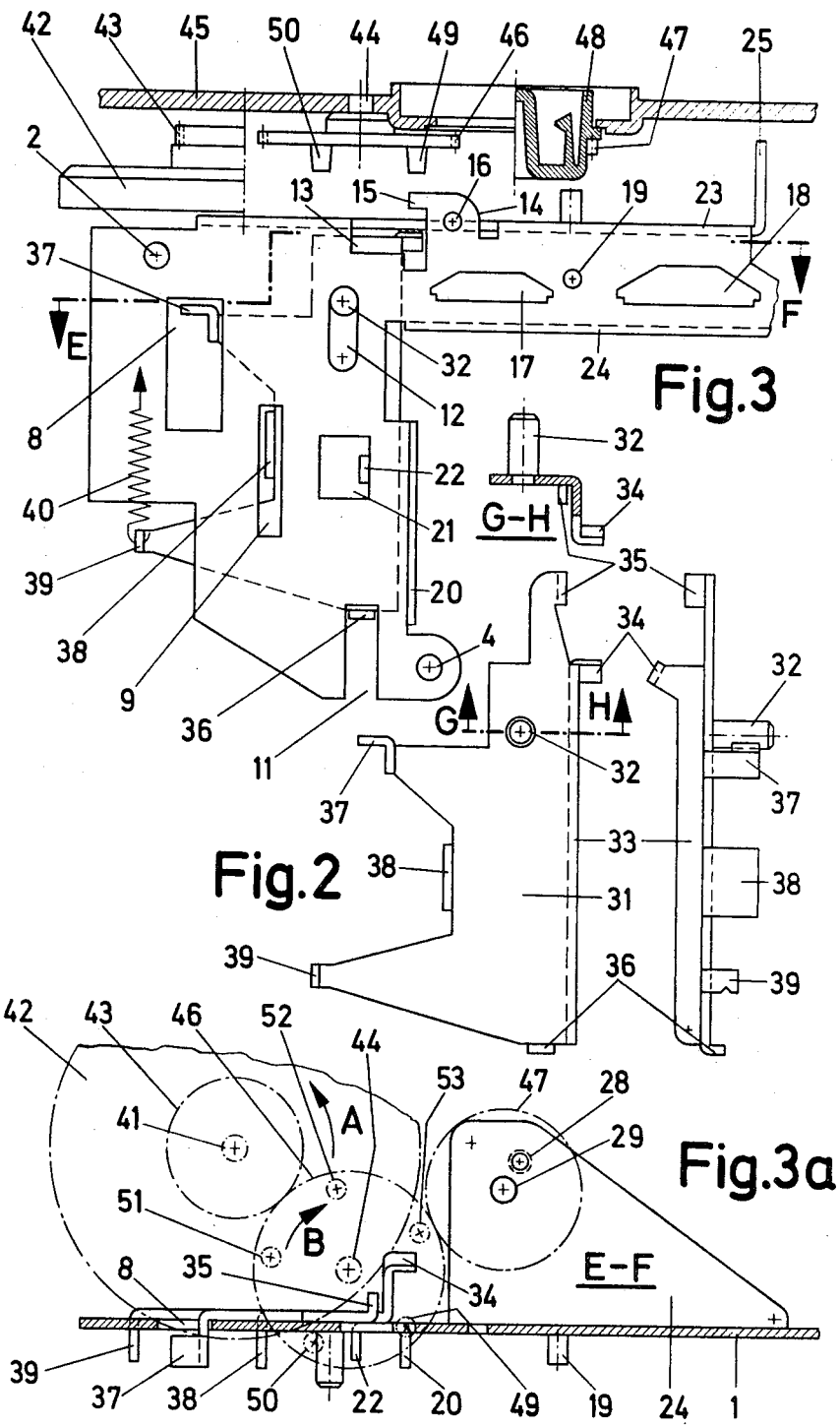

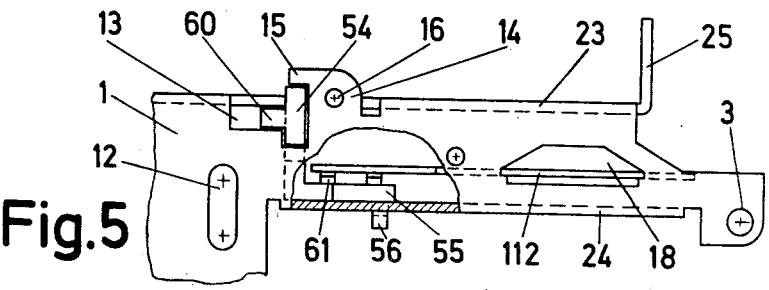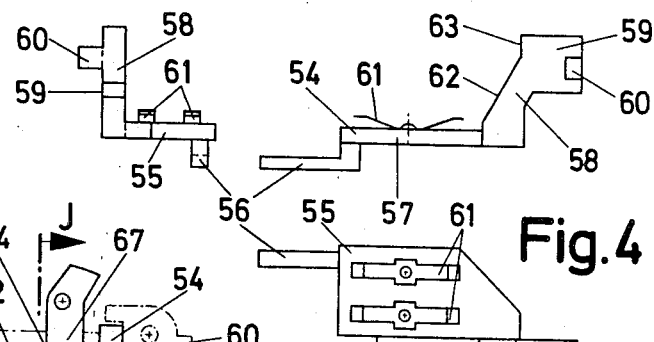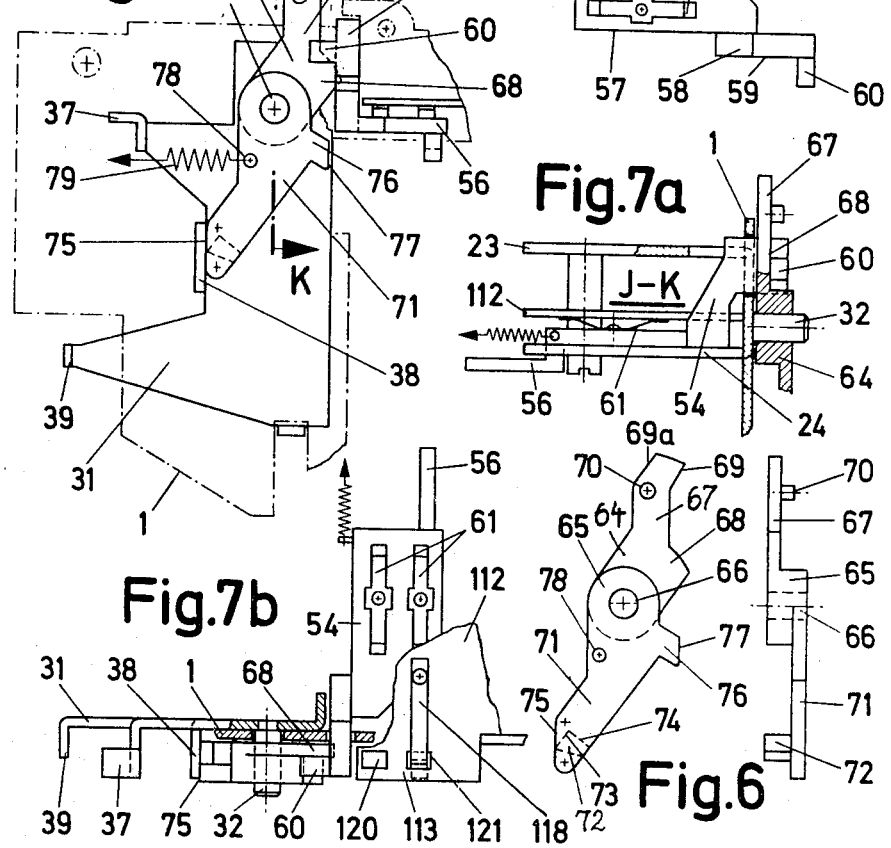

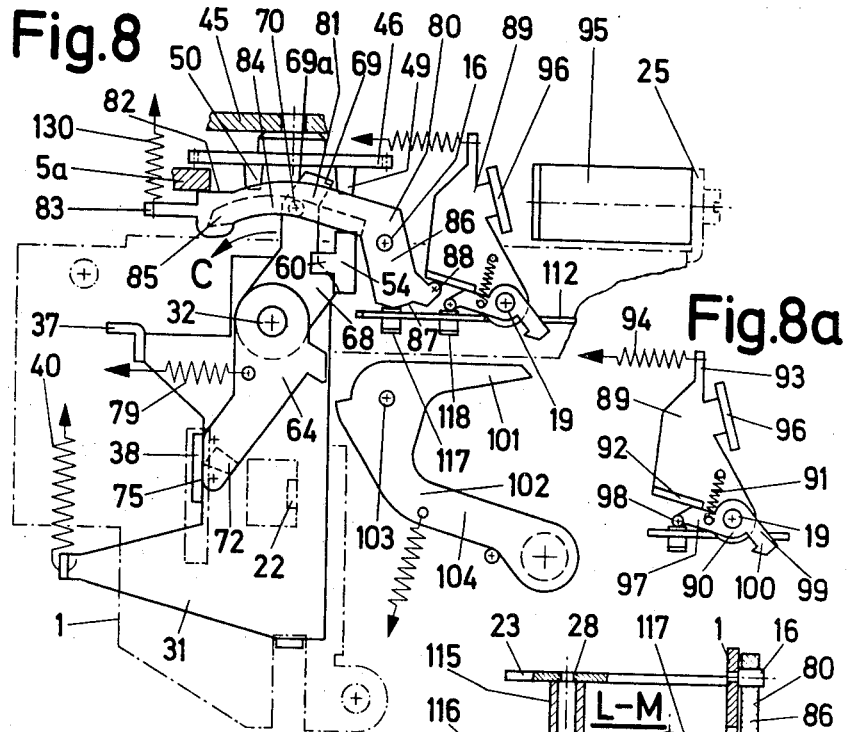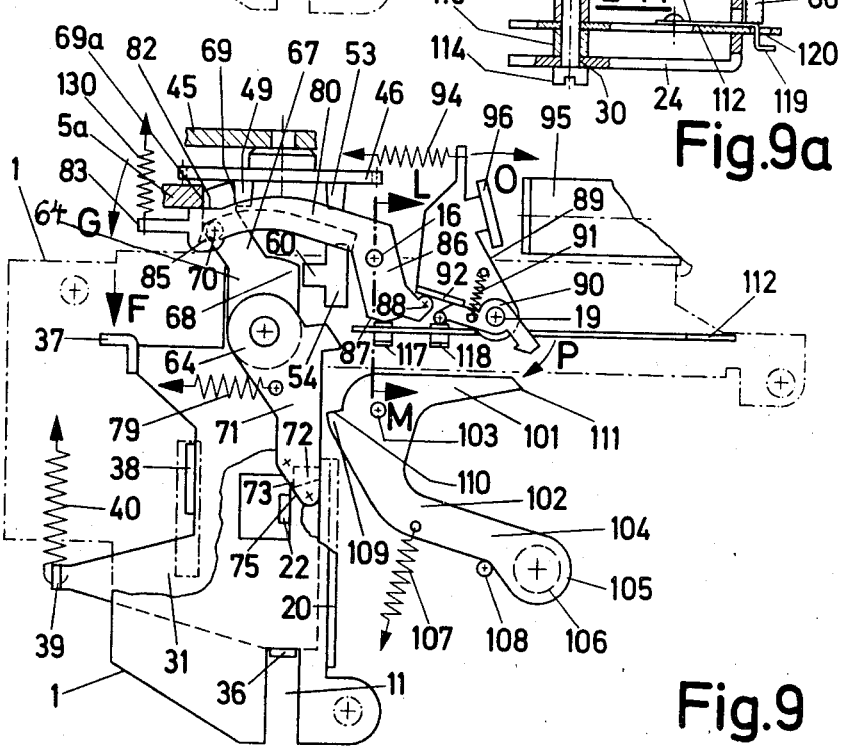

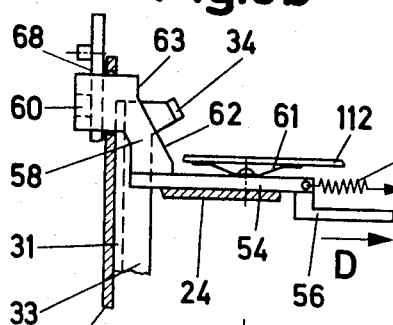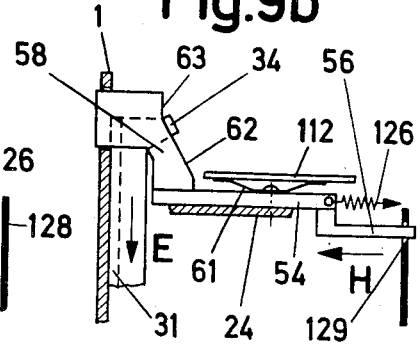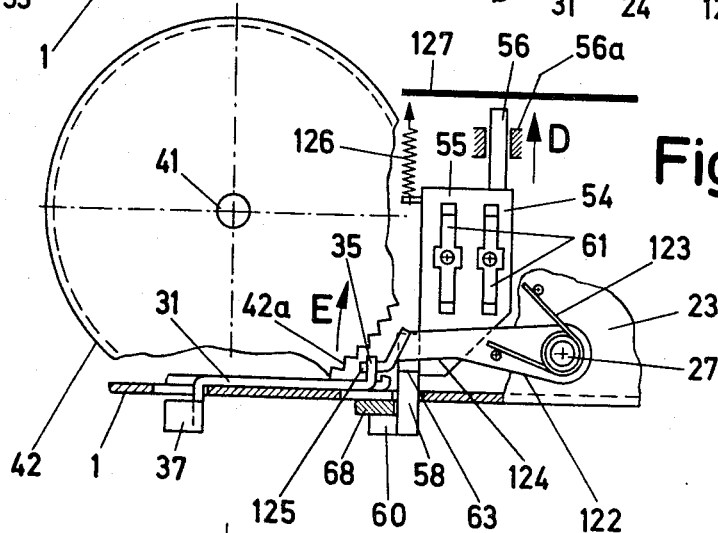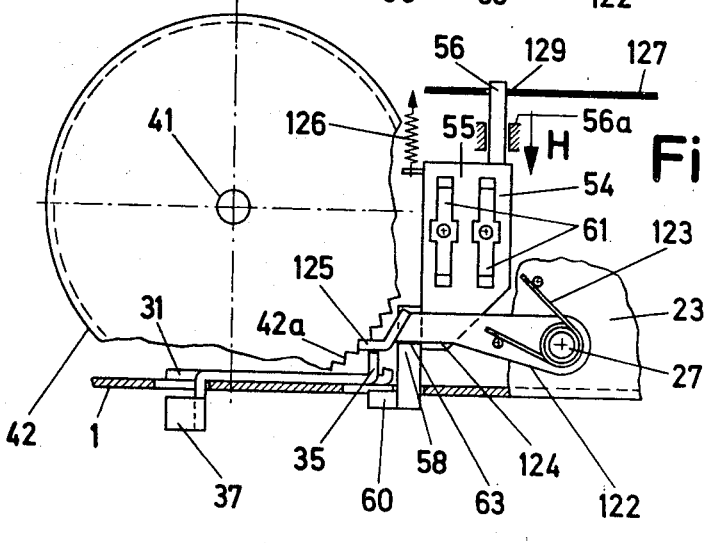

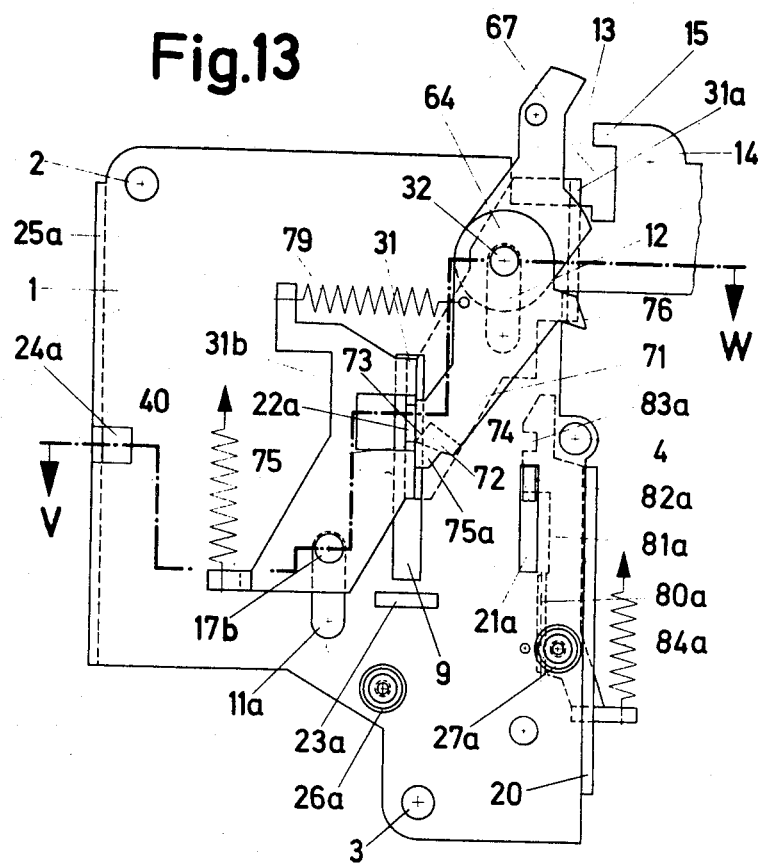
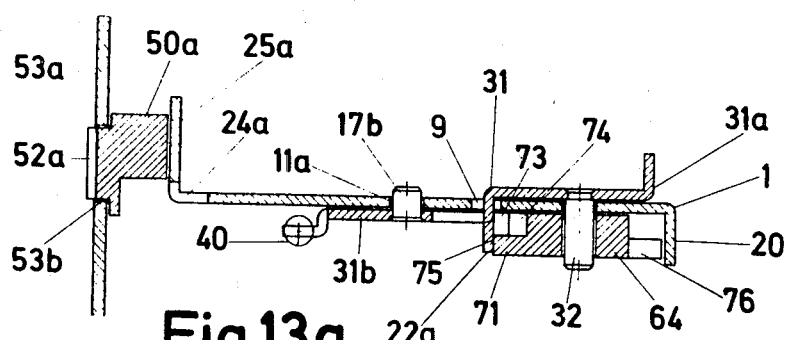

X-Y

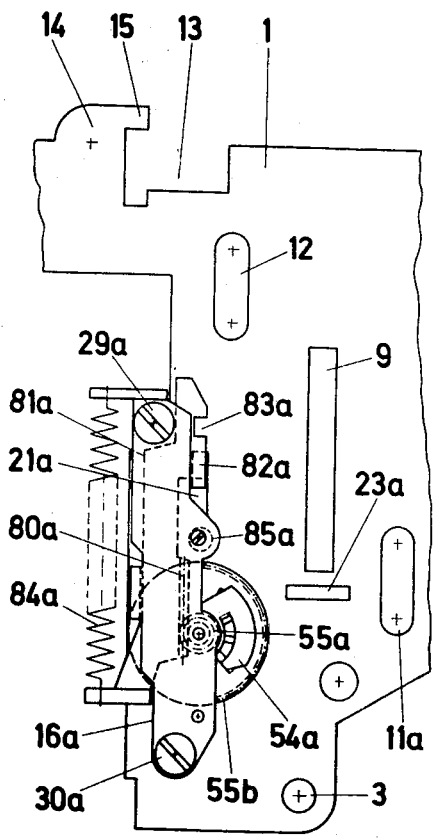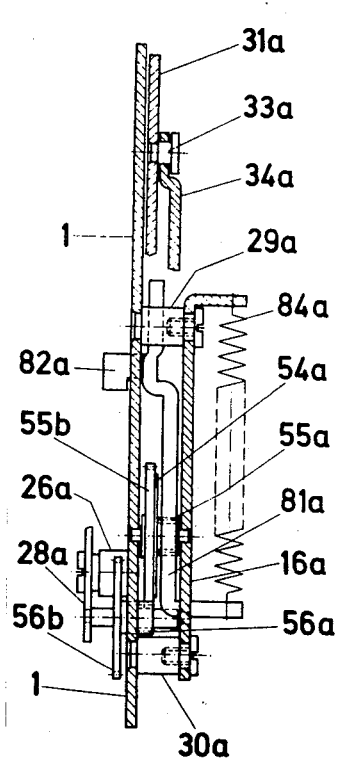
Fig. 15 b
Fig. 15 a
A'-B'

PHOTOGRAPHIC CAMERA WITH ELECTRICALLY OPERATED FILM METERING AND TIMING MECHANISM

BACKGROUND OF THE INVENTION

The present invention relates to a photographic camera with electrically operated equipment and elements. A scanner senses perforations in a roll of film which has one perforation for each exposure frame. A circuit board is situated parallel to the direction of motion of the scanner which is also provided with spring contacts cooperating with conductive paths on the circuit board. During the displacement of the scanner, which depends upon the chosen operating condition of the camera, the contacts execute switching functions for controlling the electrically operated elements of the camera.

In accordance with the present invention, the camera is also provided with a flash cube holder which is positively indexed during the film advance, and moves a lever into a tensioned position in cooperation with a friction clutch. If film has not been inserted into the camera, the lever releases the scanner for locking the film advance. If, on the other hand, film has been inserted into the camera, the lever is set into a locking position when a finger provided on the scanner drops into a perforation through the film.

At the same time that the scanner actuates a locking lever for alternatingly controlling the film advance and release function, the locking lever moves from a first position into a second position, which locks the film feed or film advance, The shutter release mechanism is locked after each release operation, and the locking lever remains in the second position when the shutter release mechanism has returned to its initial position. When the finger of the scanner drops into a perforation through the film, when a new frame has been advanced, the locking lever is returned to its first or initial position through an actuating edge during the motion of the finger. In this first position of the locking lever, the film advance or transport wheel is again locked.

The tensioning lever is mounted on a shutter or exposure release slider, and is displaced in the direction of the releasing motion, during a shutter release operation. The tensioning lever is retained in its tensioned position by a stationary projection, until the release point or release instant is reached. At that instant, the tensioning lever can then pass behind the projection and open the shutter blade with its actuating portion, be being spring driven.

With this arrangement of the present invention, a relatively inexpensive and reliable delayed exposure timing mechanism is realized. With such delayed timing mechanism, the shutter release mechanism can be preset to take an exposure after a predetermined time interval which allows, for example, the photographer to appear in front of the camera and to be part of a group to be photographed.

In accordance with the present invention, furthermore, the projection which was stationary above in maintaining the tensioning lever in its tensioned position, is also made displaceable in the direction of the release motion. In the case of non-automatic exposures, a suitable device is provided for this purpose which leaves the projection in its place as previously so that the normal operation of the shutter remains unchanged. In the case of automatic exposures, at the time, the projection is reciprocated in the same direction through suitable means during the depression of the shutter release button or the like. Upon reaching release point after a time interval determined by the mechanical or electronic timing or delay mechanism, the projection returns to its initial position, and thereby releases the tensioning lever for triggering the shutter. A transmission slider or lever controls a driving link which connects or disconnects the release slide from the displaceable retarding slide. The transmission slide, at the same time, actuates a retaining pawl for keeping the release slide in its releasing position until the operation of the timing mechanism.

Cameras are already known in the art in which an alternate film advance and exposure release locking mechanism are used to alternatingly advance the film and lock the exposure release. Such an arrangement has been known in the art even in conjunction with positively indexed flash cube holders. However, the conventional designs are not suitable for use in cameras having electrically controlled equipment as, for example, electronically controlled shutters. This is due to the condition that electrical switching operations must be performed in such cameras with electronically controlled shutters, whereby expensive insulation problems arise. Such problems can usually be only overcome through costly insulated switching devices or levers for the conventional cameras.

Accordingly, it is the object of the present invention to provide a camera of economical design, and complying with the requirements for operating cameras with electronically controlled shutters and electrically-operated accessories.

It is the object of the present invention to provide such a camera when equipped with or without a timing mechanism.

It is also the object of the present invention to provide a camera of the foregoing character which is simple to operate, reliable, and foolproof in extreme cases.

To solve the problem associated with electrical insulation, the present invention provides for construction which uses plastic material. The levers which actuate simultaneously the switches and spring contacts, are made of plastic material formed through injection-molded parts. The electrical switching operations are accomplished through the displacement motion of the scanner and retarding slide. The use of plastics in the construction of the elements of the camera in accordance with the present invention permits particularly economical manufacture through the use of multiple molds in the fabrication process. The plastic parts also possess a more favorable coefficient of friction, so that less wear occurs when the parts slide against each other. As a result, the reliability of operation of the camera mechanism is increased.

BRIEF DESCRIPTION OF THE DRAWINGS

In the following description and in the claims, parts will be identified by specific names for convenience, but such names are intended to be as generic in their application to similar parts as the art will permit. Like reference characters denote like parts in the several figures of the drawings, in which FIG. 1 is a front view of a panel with a circuit board shown in broken lines.

FIG. 1a is a front view of the panel,

FIG. 1b is a side view of the panel taken on the line A–B of FIG. 1,

FIG. 1c is a section taken on the line C–D of FIG. 1 with circuit board shown in broken lines, FIG. 2 is a front view, side view and a section taken on the line G–H of a release slide, FIG. 3 is a front view of the panel with fitted release slide and a section through the upper portion of the camera, showing the intermediate gear, and a half section through the flash cube holder and a half-view of the film feed wheel, FIG. 3a is a section taken on the line E–F of FIG. 3 with indicated bearing points and sectors of feed wheel, intermediate gear and flash cube holder, FIG. 4 shows three views of the scanner constructed as a stop slide with riveted spring contacts, FIG. 5 is a fragmentary view of the panel with fitted stop slide and inserted circuit board, FIG. 6 is a front view and a side view of the tensioning lever, FIG. 7 is a front view of the panel shown in chain-dotted lines for the sake of clarity, with fitted release slide and fitted stop slide and the tensioning lever rotatably mounted on the release slide, FIG. 7a is a section taken on the line J—K of FIG. 7, FIG. 7b is a plan view of FIG. 7 comprising a part of the circuit board and a contact spring, FIG. 8 is an overall view of the levers mounted on the panel and the parts co-operating therewith, in the inoperative position when the camera has been triggered, FIG. 8a is a view of the armature lever, pawl and spring contacts of the circuit board, FIG. 8b is a side view of FIG. 8 from the right with the stop slide in the locked position, omitting non-essential details, FIG. 8c is a plan view of FIG. 8 with the stop slide in the locked position, omitting non-essential details, FIG. 9 is an overall arrangement showing the positions of the levers mounted on the panel and of the parts co-operating therewith and the camera tensioned, FIG. 9a is a section taken on the line L–M of FIG. 9, omitting non-essential details, FIG. 9b is a side view of FIG. 9 from the right with the stop slide in the unlocked position, omitting non-essential details, FIG. 9c is a plan view of FIG. 9, with the unlocked stop slide omitting non-essential details, FIG. 13a is a section taken on the line V–W of FIG. 13 omitting non-essential details.

FIG. 15a is a side view taken on the line A'–B' of FIG. 15, omitting non-essential details, FIG. 15b is a rear view of the panel with a timing mechanism and bearing plate.

DESCRIPTION OF THE PREFERRED EMBODIMENTS

Figure 10:
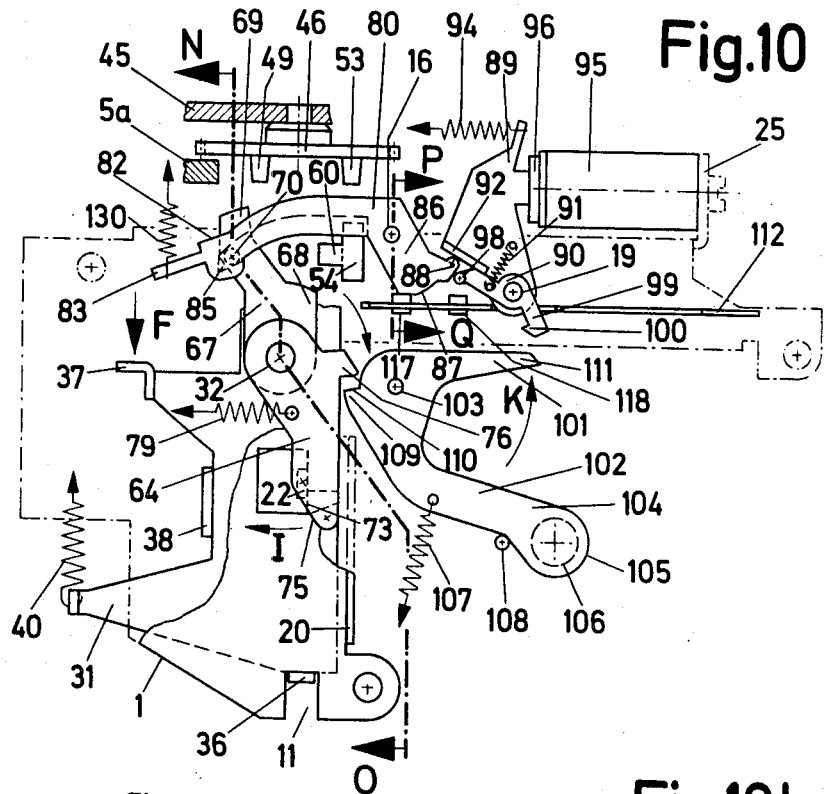
FIG. 10 is an overall view showing the positions of the levers mounted on the panel and of the parts co-operating therewith, with the camera shutter release half-depressed.

Referring to the drawing and in particular to FIGS. 1–1c, a panel member 1 is held in place by three retaining pins 5,6,7 on the front of the camera case. These pins are threaded into holes 2,3,4, respectively, in the panel member 1. The latter is further provided with rectangular openings 8,9, a corner cutout 10, an open-end slot 11, and a slot 12 with elongated shape for receiving the release slide 31 shown in FIG. 2. The design takes into account requirements for freedom in assembly.

The angular opening 13 in conjunction with an adjacent lug portion 14 terminating in a nose portion 15 integral therewith, are used to guide the stop slide 54 shown in FIG. 4. The bearing pin 16 riveted to the lug 14, is used for mounting a transmission lever 80 shown in detail in FIG. 11. The panel member 1 is also provided with openings 17 and 18 having lateral slots 17a and 18a for receiving bifurcated circuit board attachments 113, shown in FIGS. 1c and 7b. A pin 19 shown in FIGS. 1,1a and 9, is also riveted to the front of the panel member 1 for mounting an armature lever 89 and a pawl 90. The angled projection 20 and abutment 22, illustrated in FIGS. 1b and 1c, serve to limit rotation of the tensioning lever 64 shown in FIG. 6, and to guide the motion of this lever. The abutment portion 22 resides within the recess 21. Edges 23 and 24 of the panel member 1 are bent inward at the top and bottom, into the plane of the drawing, so that they form a rearward open member of U-shaped cross section as shown in FIG. 1b.

The upper edge 23 has an angular bent portion 25 which contains threaded holes 26 for accommodating screws for the purpose of holding a magnet 95 in place. This magnet 95 is shown in FIGS. 8 and 9. The bent-up edge 23 is also provided with a riveted pin 27 which serves as a bearing member for the locking lever 122, shown in FIGS. 8c and 9c. A hole 28 in the edge 23, furthermore, serves as a bearing opening for the flash cube holder 48, shown in FIG. 3. A still further opening 29 in FIG. 1a on the edge portion 23, serves as a threaded hole for attaching a circuit board 112, illustrated in FIG. 1c. The lower edge 24 of the panel member 1 contains an opening 30, as shown in FIG. 1c, which lies opposite to the opening 29.

Referring to FIG. 2, the release slide 31 is provided with a riveted bearing pin 32 and a reinforcing angled edge 33 which has a further angled projection 34 at its top. At the upper end of the release slide 31, is a locking ear 35. A guide nose portion 36 is provided at the lower end of the slide 31. A release lug 37 is situated at the left end on the release slide, as are an abutment portion 38 and a retaining arm 39 operating in conjunction with a tension spring 40, as shown in FIGS. 8 and 9. When assembled in place, the release slide 31 is located behind the panel member 1. The slide is guided through its guide nose portion 36 projecting into the slot 11 in the panel, as well as through its riveted bearing pin 32 which projects into the slot 12 of the panel member, as shown in FIG. 3. The release lug 37 and abutment 38 project through the rectangular openings 8 and 9 in the panel member, and beyond the front surface of the panel shown in FIG. 3a. The retaining arm 39 for the tension spring 40 which retains the release slide 31 in the inoperative position as shown in FIG. 3a, is similarly situated. The operative plane of the inclined angled projection 34 rests on the rear of the panel member.

FIG. 3a shows, furthermore, the bearing axis 41 of the film feed wheel 42, shown in broken lines for purposes of clarity. A gear 43 integral with the wheel 42 meshes with an intermediate gear 46 which is rotatable about an axis 44 at or within an opening in the top wall 45 of the camera, as shown in FIG. 3. The intermediate gear 46 meshes, in turn, with a gear 47 on the flash cube holder 48. The latter is also mounted on the top wall 45. When the film feed wheel 42 is turned in the direction of the arrow denoted by A, in FIG. 3a, the flash cube holder 48 becomes turned correspondingly. The intermediate gear 46 is provided, furthermore, with uniformly spaced feed pins 49–53 on its lowest side, as may be seen from FIGS. 3,3a and 9. These feed pins cooperate, in a manner to be described, with the tensioning lever 64 as shown in FIGS. 6,7,7a and 9. The stop slide 54 is preferably made of plastic material and has, as shown in FIG. 4, a base plate 55 with angular film perforation sensing finger means 56 situated on the under surface. The guide arm 58 formed from the front side surface 57, points upward and to the right. The border edge, shown in the upper portion of FIG. 4 points to the left, and has an upper actuating surface 63 joined to a lower inclined sliding surface 62. The surface 69 of the guide arm 58, has an integral locking blade 60.

On the upper side of the base plate 55, the stop slide 54 is provided with firmly mounted and resilient spring contacts 61. In assembled state, the stop slide 54 is movably guided through the angular opening 13 in the panel member, as shown in FIG. 5, so that the spring contacts 61 are free to open or close the associated circuits on the edged or printed circuit board 112, when the stop slide is at its terminal or end positions. The tensioning lever 64 which cooperates with the locking blade 60 of the stop slide 54, is also preferably made of plastic material. This tensioning lever has a bearing bushing 65 with a bearing bore 66.

The construction of the lever 64 is shown in FIG. 6. An actuating lug 67 projects upward on the lever, and is formed to the left of the bearing bushing 65, when referring to a side elevation. In a plan view, on the other hand, the outline is such that the locking surface 68 is directed to the right in the lower third position, after the tensioning lever 64 rotates to the left. The locking surface 68 can cooperate with the locking bushing 60 of the stop slide just before the tensioning lever reaches its end position. At its upper end, the actuating lug 67 has a stop surface 69 which points to the right, and a driving peg 70 is mounted on the surface to the left when looking at the front view of FIG. 6. In referring to the side view of FIG. 6, a downward directed actuating lug 71 is formed to the right of the bearing bushing 65. A stop projection 72 points to the left, at its end, and is provided with stop surfaces 73 and 74. The end of the actuating lug 71 is formed so that the stop edge 75 is vertical when the tensioning lever 64 is in its inoperative position.

In the first third portion of the downward-directed actuating lug 71, is an actuating nose portion 76 having an outer surface 77. A hole 78 in the lug 71, is provided for receiving one end of a tension spring 79. In the inoperative position of the tensioning lever 64, the locking surface 68 is behind the locking blade 60 of the stop slide, as shown in FIG. 7. The stop edge 75 is in contact with the abutment portion 38, due to the action of the tension spring 79.

A transmission lever 80, shown in FIG. 8, is mounted on the front panel member 1 so as to rotate about the bearing pin 16. The transmission lever 80 is also preferably made of plastics material, and has an arcuate transmission arm 81 extending to the left of the pivoting axis 16. At the end of the arm 81, is a bearing surface 82 with a retaining finger 83 shaped to accommodate a tension spring 130. The back of the transmission arm 81 is situated on the lower edge and has a rectangular opening 84 at its open end, as shown in the sectional view RS in FIG. 11. This opening extends between the bottom and back, and merges at the end of the transmission arm 81, into a rectangular pocket 85 which is open only at the back, as may be seen in section P–U of FIG. 11.

The transmission lever 80 has, furthermore, a lug 86 on the other side of the bearing pin 60. This lug 86 is directed downward and up an incline to the right which terminates into a downward-pointed surface used as a switch cam 87. The latter cooperates with the contact 117, shown in FIGS. 8 and 9, in a manner to be described. The border edge of the lug 86 points to the right and terminates into a stop portion 88. An armature lever 89 and pawl 90 have a common axis of rotation through the bearing pin 19 riveted to the front of the panel member, as shown in FIGS. 8 and 8a. The pawl 90 is in contact with the angled edge 92 of the armature lever 89, through the action of a tension spring 91. At its upper end, the armature lever 89 has a retaining finger 93 for the tension spring 94. This spring keeps the lever in the inoperative position, as shown in FIG. 8.

In the upper third portion of the armature lever 89, is an angled armature plate 96 which cooperates with the holding magnet 95. The pawl 90 is preferably made of plastic material, and has an arm 97 located to the left of the axis of rotation 19. The end of the arm 97 terminates in a cam 98 which actuates a contact 118, in a manner to be described. The arm 99 of the pawl 90 points at a downward-directed incline, to the right of the pivoting axis 19. This arm 99 is formed at its end in a locking projection 100 which can be made to engage a lever arm 101 of the shutter blade 102. The latter is mounted so that it can rotate on the side of the camera about the axis 103, as shown in FIG. 9.

The shutter blade 102 also has a blade arm 104 in addition to the lever arm 101. This blade arm first extends downward and is then bent to the right so as to approximate the shape of a horse shoe. In the inoperative position of the shutter blade 102, as shown in FIG. 9, the enlarged end 105 of the downward-inclined blade arm 104, covers the opening 106 of the diaphragm, since the traction spring 107 draws the blade arm 104 against the stop 108. The shutter blade 102 is formed to the left of the axis of rotation 103, so that a projection or stop 109 results. This stop 109 has an operative surface 110 accessible from above. The lever arm 101 is located at the level of the axis of rotation 103, and terminates in a projection 111 which narrows toward its end.

The circuit board 112 is situated in the lower third of the U-shaped portion formed through lugs 23 and 24 on the panel, as shown in FIG. 9a. The circuit board is held in place on the front of the panel number 1, by horizontal slots 17a and 18a located in the openings 17 and 18 through the panel. The bifurcated extensions 113 of the circuit board 112 engage the slots 17a and 18a, shown in FIG. 1c. The circuit board 112 is attached at another point through a screw 114 which is threaded into holes 30 and 28 in the lugs of the panel member, as shown in FIGS. 1c and 9a. Through the use of two spacing bushings 115 and 116, the circuit board 112 is held parallel to the lugs 23 and 24. The circuit board 112 also has two riveted spring contact 117 and 118, shown in FIGS. 9 and 9a. These contacts project with their bent contact surfaces 119, through two openings 120 and 121 in the circuit board 112, shown in FIGS. 7b and 9a. The spring contact 117 cooperates with the transmission lever 80, whereas the spring contact 118 cooperates with the pawl 90. This may be seen from FIGS. 9, 9a, and 10b. On the upper bent-over panel lugs 23, a a locking lever 122 is mounted on the riveted pin 27. The lever 122 is acted upon by a torsion spring 123 which urges the lever into its inoperative position, as shown in FIG. 8c. The locking lever 122 has an angled bend 125 on its arm 124. This bend cooperates with the teeth 42a of the feed wheel 42. These teeth 42a are distributed about the circumference of the feed wheel.

Referring to FIGS. 13 to 19, the panel member 1 has a rectangular-shaped opening 9 for the purpose of receiving the release lever 31. Slots 11a and 12 are provided to guide the release slide 31 as shown in FIGS. 13 and 15b.

Figure 14:
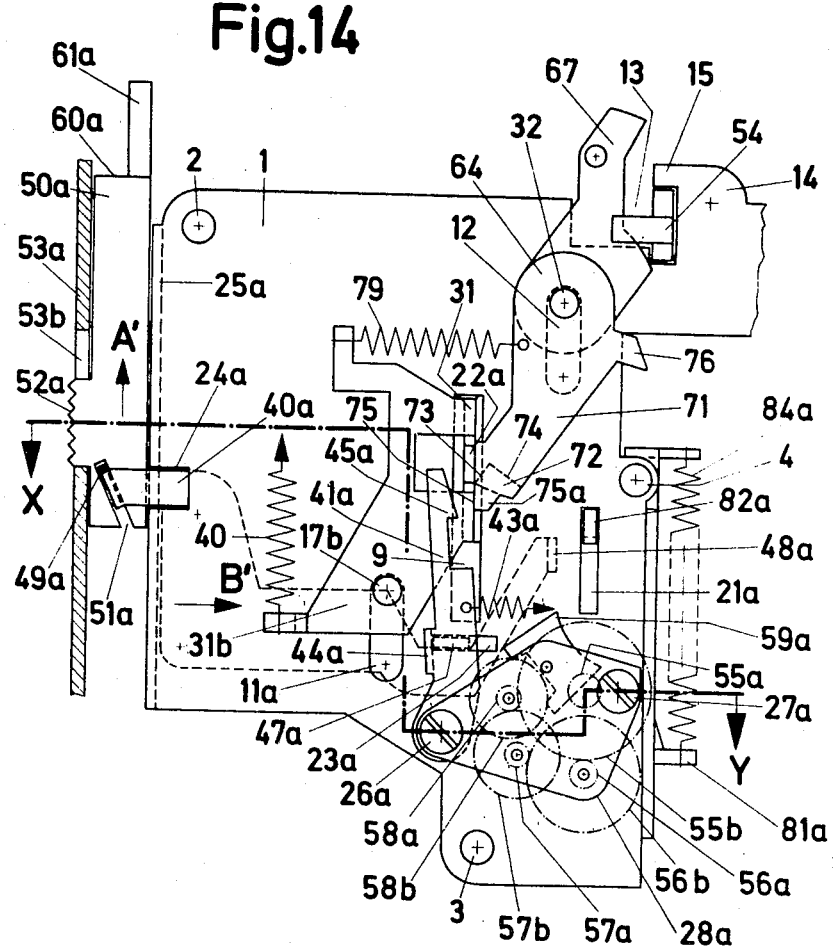
FIG. 14 is a front view of the panel with retarding mechanism, retaining pawl, automatic exposure control slide and tension lever in the tensioned position.
Figure 14A:
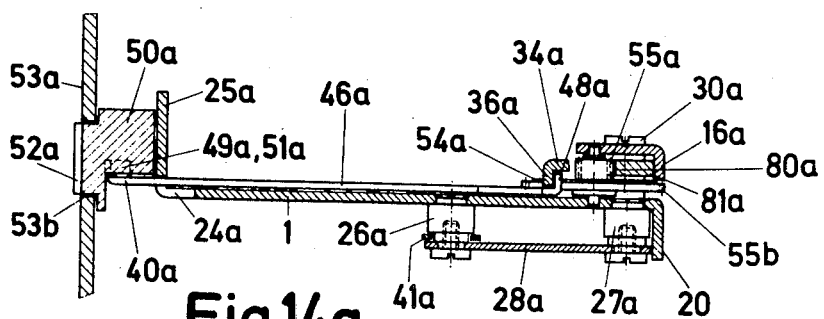
FIG. 14a is a section taken on the line X–Y of FIG. 14 omitting non-essential details.
Figure 15:
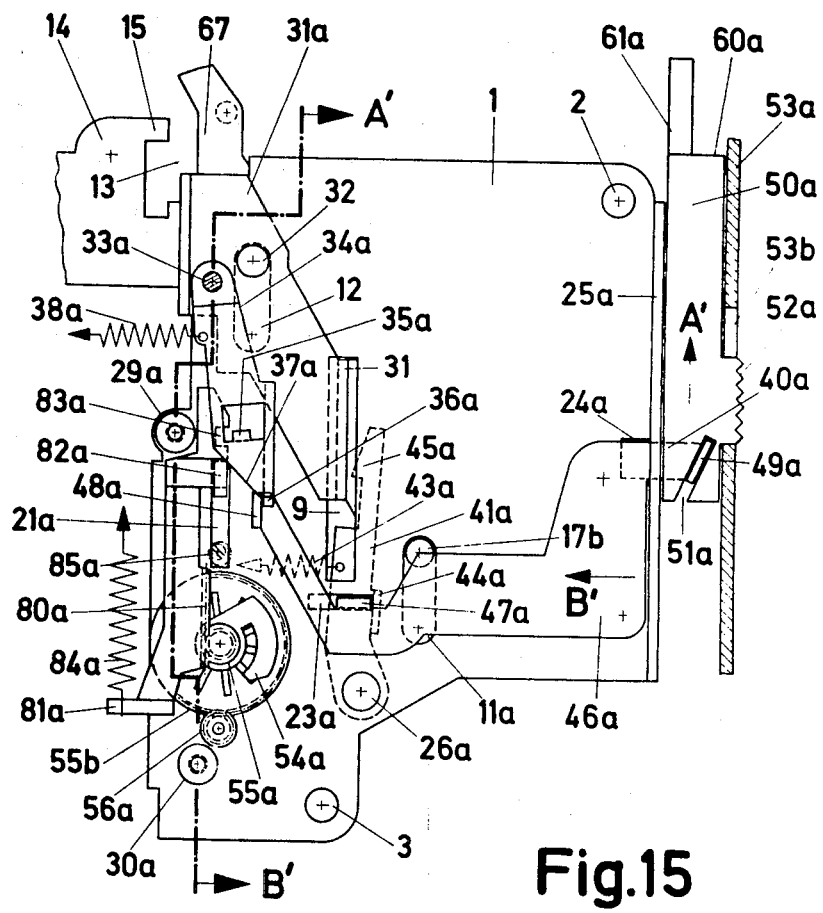
FIG. 15 is a rear view of the panel showing the complete arrangement of levers and sliders.

The panel member 1, furthermore, has vertical rectangular-shaped opening 21a, a horizontal rectangular opening 23a, *and an opening 24a* as well as a contact edge 25a and border edge 20. Threaded bushings 26a and 27a are riveted to the front side of the panel member 1, as shown in FIGS. 13 and 14, for the purpose of holding in place the base plate 28 *a* of the retarding mechanism detailed in FIGS. 14 and 14a. On the back of the panel member 1, threaded bushings 29a and 30a are riveted as shown in FIGS. 15 and 15b. These threaded bushings 29a and 30a serve to mount in place the bearing plate 16a. On the upper half 31a of the release slide 31, is a riveted bearing pin 32 which extends through the guide slot 12 from the back of the panel member, and serves as a bearing shaft for the tensioning lever 64 on the front of the panel. The upper half 31a passes through the rectangular opening 9 in the panel and resides, thereby, on the back of the panel, as shown in FIGS. 13 and 13a.

The second guide point for the release slide 31 is formed through the other bearing pin 17b in the lower half of the release slide 31b, in conjunction with the slot 11a in the panel member. The release slide 31, furthermore, has a turned-over portion which acts as a stop projection 22a at the center. The tensioning lever 64 is urged against this projection 22a, through the action of the spring 79, when the shutter is not under tension, as shown in FIG. 13 and 13a. The release slide 31 is held in its normal or inoperative position through the action of spring 40. The tensioning lever 64 mounted on the bearing pin 32 of the release slide 31, has an upward-directed actuating lug 67 which cooperates with a stop slide 54 as well as with the cams 42 to 53 of an intermediate gear 46, as already described above. The downward-directed actuating surface 71 has also, at its end, projections 75a and a stop edge 75. The threaded bushing 26a on the front of the panel member serves simultaneously as a bearing axis for a retaining pawl 41a, as shown in FIGS. 14 and 14a. The retaining pawl 41a is acted upon by a spring 43a which urges the pawl against the actuating projection 47a of the transmission slide 46a through its angled projection 44a.

Figure 17:
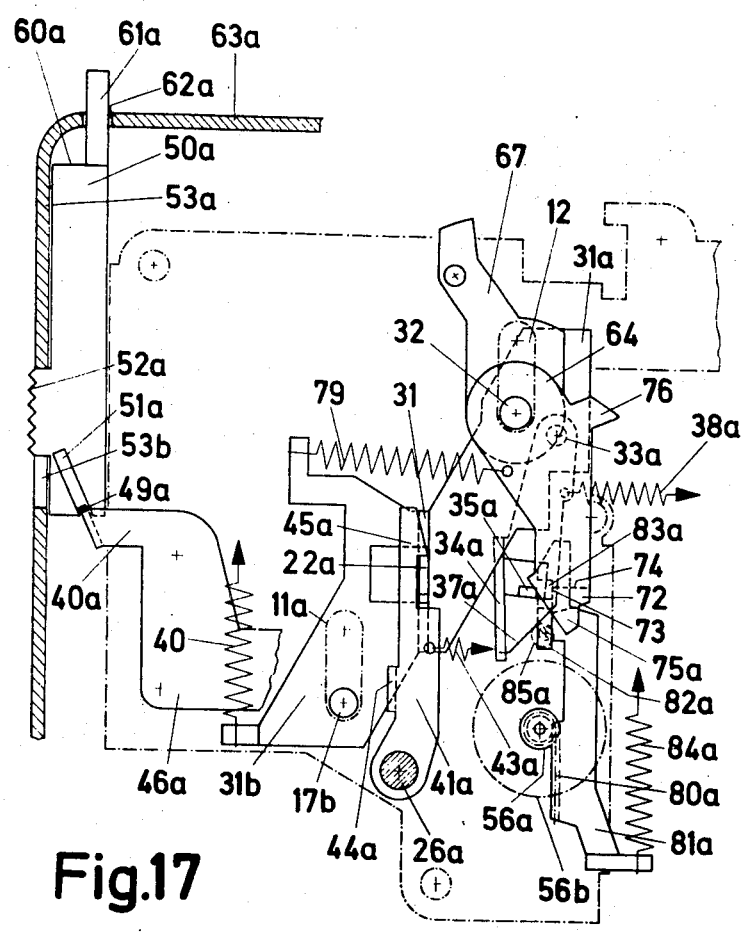
FIG. 17 is a front view of the complete arrangement of levers and slide members with the shutter release depressed and locked, with the outline of the panel board shown in broken lines.

The retaining pawl 41a, furthermore, is shaped at its upper end with a locking projection 45a which cooperates with the stop projection 22a of the release slide 31, as shown in FIGS. 14 and 17. The transmission slide 46a has an engaging projection 48a, in addition to the actuating projection 47a at its right end. The projection 48a cooperates with a link 34a. The transmission slide 46a engages, on its guide arm 40a, the angled inclined lug 49a through a beveled slot 51a of an automatic exposure switch slide 50a. The transmission slide 46a is guided by the actuating projection 47a which engages the rectangular-shaped opening 23a in the panel member. The slide is also guided by the guide arm 40a formed in the opening 24a in the panel.

The automatic exposure switch slide 50a, on the other hand, is guided by the contact edge 25a of the panel member 1, as shown in FIGS. 14 and 14a, and by the opening 53b in the side wall of the camera. The actuating knob 52a of the switch slide 50a is accessible from the outside through this side wall 53a of the camera.

Figure 16:
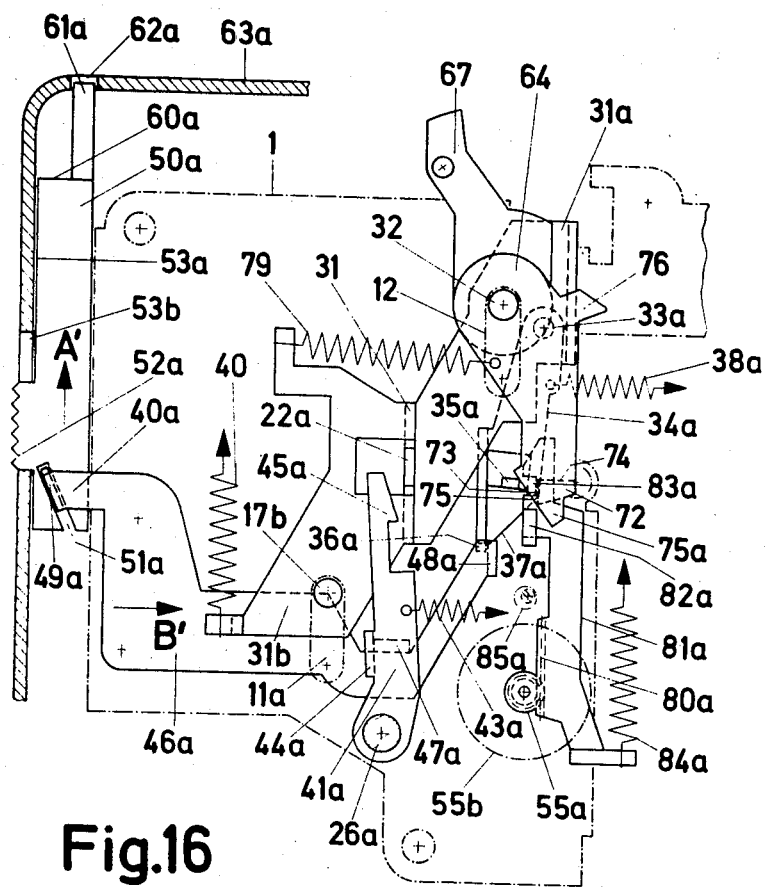
FIG. 16 is a front view of the complete arrangement of levers and slide members before the shutter release with the outline of the panel shown in broken lines.

On its upward-directed side 60a, the switch slide 50a has a pin 61a which extends through an opening 62a in the top wall 63a of the camera, after the switching motion. The pin 61a is in proximity of a release button, not shown in the drawing, and thereby provides a visible and definite display for the photographer, that the camera is in the "automatic exposure" position. This may be seen from FIGS. 16 and 17. It has been found from experience, that this feature is an essential one since the timing mechanism may otherwise remain switched on so that an exposure may fail due to the switched-on timing mechanism. On the rear of the release slide 31 and in the upper half 31a, the link 34a is mounted so as to be rotatable about the axis 33a, as shown in FIGS. 15 and 16.

The link 34a is provided with an angled projection 35a, a stop projection 36a, and a bevelled surface 37a. The latter cooperates with a setting eccentric 85a, in a manner to be described. The link 34a, in addition, is acted upon by a spring 38a. The retarding or advancing mechanism has intermediate gears 55a, 55b, 56a, 56b, 57a, 57b, retarding gears 58a, 58b, and a retarding armature 59a. In the embodiment illustrated, driving pinion 55a and driving gear 55b of the retarded mechanism are mounted on the rear of the panel through a bearing plate 16a which is fastened at locations 29a and 30a as shown in FIGS. 15a and 15b. The driving gear 55b is connected through a ratchet spring 54a, to the driving pinion 55a, so that transmission of torque takes place in only one direction. The driving pinion 55a meshes with the teeth 80a of a retarding mechanism slide 81a. This mesh prevails at all times. The retarding mechanism slide 81a extends with its angled projection 82a through a perpendicular and rectangular-shaped opening 21a in the panel 1. The retarding mechanism slide 81a thereby extends into the path of motion of the tension lever 64 on the front of the panel. The retarding mechanism slide 81a is also provided with an opening 83a and is acted upon by a spring 84a. A setting eccentric 85a is mounted in the bearing plate 16a and cooperates with the bevelled surface 37a of the driving link 34a. The retaining pawl 41a and the link 34a are actuated by the transmission slide 46a through means of the projections 47a and 48a. In the embodiment shown, the transmission slide 46a is actuated by the bevelled slot 51a of a switch slide 51a.

In operation of the camera, in accordance with the arrangement of FIG. 8, the release means is locked and the film feed wheel 42, shown in FIG. 3a, is free, when the camera is in the inoperative state after having taken an exposure, for example. For the purpose of carrying out a new exposure, the film feed wheel 42 is turned in the direction of the arrow A, shown in FIG. 3a, so that the intermediate gear 46 turns, thereby, in the direction of the arrow B. A gear 43 in mesh with the gear 46 is mounted and secured to the feed wheel 42 for this purpose.

The flash cube holder 48 is also rotated when the film feed wheel 42 is turned, because the holder is mounted on the gear 47 which meshes with the intermediate gear 46. The rotation of the flash cube holder 48, however, is limited through a slip clutch, so that the holder can execute only a 90° indexed step or rotation. The mechanism for this particular feature is not described in detail as it is already known in the art.

Figures 10A, 10B, 11:
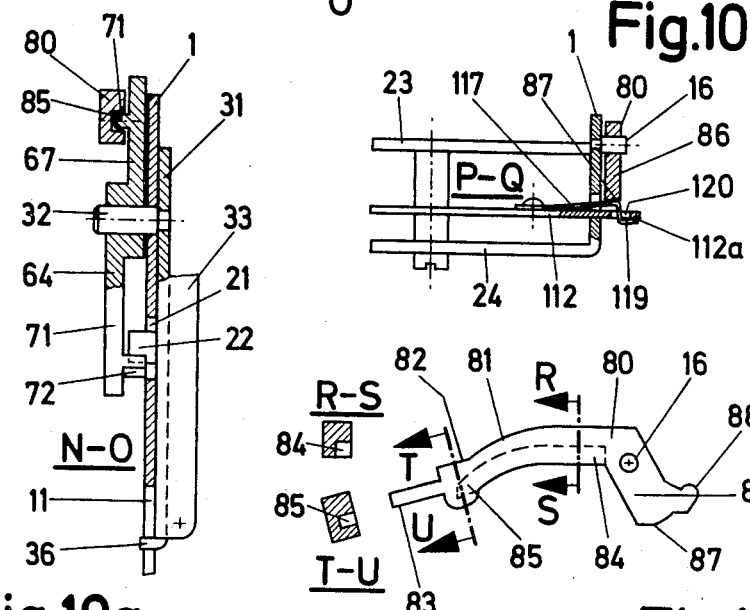
FIGS. 10a and 10b are two sections taken on the lines N–O and P–Q of FIG. 10, omitting non-essential details.
FIG. 11 is a front view of the transmission lever showing sections taken on the lines R–S and T–U.

When the intermediate gear 46 rotates in the direction of the arrow B, as shown in FIG. 3a, one of the feed cams 49 on the lower side of the intermediate gear 46 strikes against the stop surface 69 of the tensioning lever 64, shown in FIG. 8. The tensioning lever is, thereby, moved against the action of the tension spring 79, and is rotated about its pivoting center 32, in the direction of arrow C in FIG. 8. Through such rotation of the tensioning lever 64, it becomes positioned to the location shown in FIG. 9. In the initial portion of the rotation, the driving peg 70 moves in the rectangular opening 84 of the transmission lever 80, which is open at the back and bottom. The driving peg 70 stops only just before the contact edge 69a of the tensioning lever 64 strikes against the stop 5a on the casing and in the pocket 85 which is open only at the back, as shown in FIGS. 9, 10a, and 11. During the pivoting action of the tensioning lever 64, in the direction of the arrow C, the locking surface 68 of the tensioning lever releases only the stop slide projection 60 in its end position, as shown in FIGS. 8 and 9. Since the stop slide 54 is subjected to the action of spring 126, it moves after its release, in the direction of the arrow D and towards the film 127, as shown in FIGS. 8b and 8c. In operation of the camera, two separate and distinguishable cases A and B are possible. These may be described as follows:

Case A: In this state of operation, a roll of film is placed into the camera. The stop slide 54 then moves somewhat in the direction of the arrow D until it strikes against the film 127 with its scanning finger 56. As a result, the edge of the film 128 is scanned as it moves along during the feed of the film. If the film has been transported by an amount corresponding to the length of a frame, a perforation 129 appears and the scanning finger 56 drops into this perforation, as shown in FIG. 9b. During this dropping motion of the finger 56, the stop slide 54 carries out the following two operations in the direction of the arrow D.

a. The stop slide 54 strikes with its actuating surface 63 on the guide arm 58, against the arm 124 of the locking lever 122, so that the latter is pressed against the teeth 42a of the feed wheel, as shown in FIGS. 8c and 9c. This motion is applied against the action of the torsion spring 123, through the angular portion 125. The film feed wheel 42 is, thereby, locked in place when the film has been advanced by the amount of a new frame. The locking lever 122 releases, simultaneously, the release slide 31 with the release lug 37 which has been previously locked through the lug angular portion 35 by rotation about its bearing point 27, in the direction of the arrow E. The camera is thus again made ready for a new exposure.

b. The spring contact 61 secured to the stop slide base plate 55 slides in the direction of the arrow D through the stop slide movement. The spring contact 61 moves thereby onto the conductive path of the printed circuitry, and into a new position as shown in FIGS. 8b and 9b. The electronic elements in the form of, for example, the electronic shutter, metering mechanism, exposure meter, and similar such elements which may be provided on the camera, are switched from "monitoring" state to "readiness for action" or from "off" to "on."

Case B: In this state of operation, no film is present in the camera. After being released by the tensioning lever 64, the stop slide 54 moves immediately in the direction of arrow D, and to its end position. As a result, the film feed wheel 42 is locked in place, as described in Case A, paragraph a). Thus, the film feed wheel 42 is locked in place through the locking lever 122, and the transfer of the spring contact 61 on the circuit board 112 takes place as also described in paragraph b) of Case A.

The release of the stop slide 54 by the tensioning lever 64 occurs, however, only when the flash cube holder 48 has been advanced through a complete 90° angular index step which is executed through transmission of motion between the intermediate gear 46 and the gear 47 mounted directly on the flash cube holder 48.

After the operations described under cases A and B have been carried out, the camera is again made ready for taking exposures. When the photographer depresses the release lug 37 in the direction of the arrow F for taking a new exposure, the following operational steps a) to d) takes place simultaneously during the downward motion of the release slide 31:

a. The release slide 31 mounted on the panel member 1, slides downward against the action of spring 40 and produces movement of the tensioning lever 64, shown in FIGS. 6 and 7, mounted on the pivot 32 in the slide slot 12 of FIGS. 1 and 3. The tensioning lever 64 is thereby driven into the tensioned position shown in FIG. 9. The stop projection 72 on the lower actuating lug 71, moves in to the space bordered by the panel stop 22 and the panel angled edge 20, shown in FIG. 1. The tension lever stop surface 73 comes, thereby, into contact with the panel stop 22, while the upper actuating lug 67 moves with its end 69, 69a out of the path of motion of the intermediate gear feed cam 49 and the stop 5a mounted on the casing, during the downward motion, as shown in FIG. 9.

b. The transmission lever 80, shown in FIGS. 9 and 10, is connected with the lever 64, due to the pocket 85 which is open only at the back and not at the bottom and due to the condition that the tensioning lever driving cam 70 of the lever 64 is located in the pocket 85. During the release motion, the transmission lever 80 pivots against the action of the spring 130 and about the axis of rotation 16 in the direction of the arrow G, as shown in FIGS. 9 and 10. This action releases the contact spring 117, as shown in FIGS. 10 and 10b, which is mounted on the circuit board 112 and subjected to spring tension through the control cam 87, with its downward-inclined lug 87 which is now moved upward. The contact spring 117 becomes displaced against the conductive paths 112a of the circuit board 112, through the angled contact surface 119, from below. A capacitor, not shown, is thereby short circuited so that the inoperative time of the holding magnet 95 can be either compensated or calibrated. This capacitor corresponds with time constant prevailing before opening of the shutter blade 102, in FIG. 10.

c. The armature lever 89, shown in FIG. 9, is pressed by the transmission lever contact cam 88 against the angled edge 92 about the bearing point 99. The lever 89 is thereby pressed against the action of the spring 94, shown in FIG. 10, so that the armature plate 96 abuts the magnet 95. The pawl 90 is mounted on the bearing pin 19, and since it is also pressed against the armature lever angled edge 92 by the tension spring 91, it follows the rotation of the armature lever 89. The contact spring 118, tensioned through its own action by the cam 98, in FIG. 10, is thereby released. The spring 118, also comes into contact through its angled contact surface 119, with the conductive path 112a of the circuit board 112, as shown in FIG. 10 and 10b. The circuit to the battery is thus closed so that the armature plate 96 is now held by the magnet 95. The battery feeds the entire circuit arrangement including the shutter holding magnet 95. The locking projection 100 on the right arm 99 of the pawl comes within the path of motion of the shutter blade engaging projection 111, shown in FIG. 9, during this rotational movement.

d. The recovery projection 34 of the release slide 31, shown in FIGS. 2 and 9b, lies in the locking position of the feed wheel, as shown in FIG. 9c, and on the sliding surface 62 of the stop slide 54, shown in FIG. 9b. During the downward motion of the release slide 31 in the direction of arrow E, shown in FIG. 9b, it presses the stop slide 54 against the action of spring 126 and out of the film perforation 129. This motion is in the direction of the arrow H pointed back to its starting position. The stop slide 54 thereby releases the locking lever 122, shown in FIG. 9c, through its operating surface 63. The lever 122, however, cannot yet return to its starting position under the action of the torsion spring 123, since the locking lug angle portion 35 of the release slide 31 prevents this motion from taking place. The angular portion 35 is located in front of the angle 125 of the locking lever 122, when the release slide 31 is depressed, as shown in FIG. 9c. This arrangement assures that even when the release slide 31 is depressed, the film feed wheel 42 remains locked. With the simultaneous return of the stop slide 54 to its starting position, the spring contact 61 on the conductive paths 112a slide back to their starting position. Once the spring contacts 61 reach this starting position, the electronic elements mentioned above and provided in the camera, are switched from "ready for action" to "monitoring" or from "on" to "off."

Figure 12:
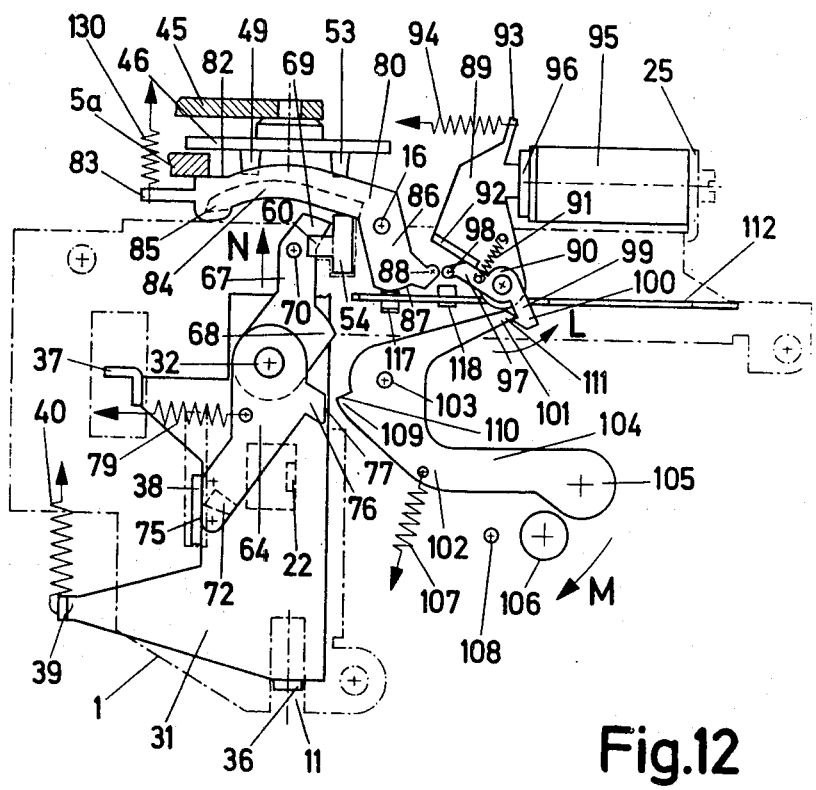
FIG. 12 is an overall view showing the position of the levers mounted on the panel and the parts co-operating therewith with the release slide completely depressed and the shutter open, FIG. 13 for an embodiment fitted with a delayed exposure timing mechanism, is a front view of the panel with release slide, the tension lever mounted on the release slide and, in broken lines, resting position of the retarding slide on the back of the panel.

The release slide 31 now nears its lower end point, shown in FIG. 10, and the tension slide 64 subjected to the action of the spring 79, maintains itself on the panel stop 22, through its stop projection surface 73. If the lever 64, which is tensioned by the spring 79, is then released at the end point of the release slide, several movements occur simultaneously:

a. Due to the force of the spring 79, the tensioning lever 64 jumps forward and in the direction of the arrow I, shown in FIG. 10. As a result, the tensioning lever 64 lies against the release slide stop projection 38, with its contact edge 75, and locks simultaneously the stop slide 54, as shown in FIG. 12. This is accomplished through the locking projection 60 with its stop surface 69 mounted on the upper actuating lug 67. The slide 54 is returned to its starting position through the release slide return projection 34 and bevelled surface 62, in the manner already described.

b. The tensioning lever 64 releases the transmission lever 80, shown in FIGS. 10 and 12, during its rotation in the direction of the arrow I, shown in FIG. 10. This results from the driving cam 70 moving out of the transmission lever pocket 85. The transmission lever 80 which is acted upon by the spring 130, pivots with its stop surface 82 against the stop 5a mounted on the casing, so that the spring contact 117 is pressed downward against through its inclined lug 86. Switch cam 87 performs this function during rotation about its axis 16, and as a result the previously short-circuited capacitor, not shown, is again connected in series with the time constant determining elements. In this manner, the capacitor can charge again before the opening of the shutter blade 102. Inoperative periods can, thereby, be compensated to a considerable extent.

c. During its return motion, the tensioning lever 64 strikes with its actuating projection 76 against the operative surface 110 of the shutter blade stop 109, shown in FIG. 10. As a result, the shutter blade 102 swings about its axis of rotation 103, on the casing, and against the action of the spring 107. At the same time, it uncovers the diaphragm opening 106 through the enlarged end portion 105 of the blade arm 104. The other lever arm 101 moves simultaneously with its engaging projection 111 towards the pawl locking projection 100, and in the direction of the arrow K. After the lever arm 101 becomes engaged with the projection 100, it is held in such engaged position, shown in FIG. 12, until the electronic circuit deenergizes the holding magnet 95. The electronic circuit operates, for this purpose, with a photo resistor which varies in resistance with the intensity of the impinging light. When the holding magnet 95 becomes deenergized, the armature lever 89, subjected to the action of spring 94, returns to its inoperative position. At the same time, the pawl 90 is driven by the armature lever 89, so that the pawl presses against the contact spring 118 in the downward direction, through the cam 98. As a result, the battery becomes disconnected from the electronic circuit, as shown in FIG. 8. During the rotation of the pawl 90, described above, the right arm 99 of the pawl swings in the direction of the arrow L, shown in FIG. 12, and the locking projection 100 releases the engaging nose portion 111 of the shutter blade 102. The latter is then drawn into its inoperative position, through the spring 107, and against the stop 108 of the casing. In this manner, the diaphragm opening 106 is again covered. The photographer then releases the lug 37, as shown in FIG. 12, and the release slide 31 rises again, due to the force applied by spring 40, with the tensioning lever 64, in the direction of arrow N, shown in FIG. 12. The slide 31 is, thereby, brought into the inoperative position, as shown in FIG. 8, with the stop surface 69 of the lever 64 now being brought into the inoperative position behind the cam 49, shown in FIG. 9, and in front of the cam 53 of the intermediate gear 46. During the return of the release slide 31 to its inoperative position, the locking lever 122 becomes released, simultaneously, by the locking lug angular element 35, shown in FIG. 9c. As a result, the locking lever 122 swings into its starting position, as shown in FIG. 8c, due to the action of the torsion spring 123. In this position, it engages the angular portion 125 under the locking lug 35 of the release slide 31, so that it becomes locked against further actuation. The camera becomes thereby placed again into its starting position, with the release mechanism locked and the film feed wheel free to rotate. A new cycle of operations can, consequently, be again initiated.

When a delayed exposure is to be taken, the switch on slide 50a is moved to its upper end position, in the direction of arrow A', as shown in FIGS. 15 and 16, for the purpose of switching on the timing mechanism. The transmission slide 46a is moved, thereby, to the right and in the direction of arrow B', shown in FIGS. 15 and 16, through the inclined slot 51a. The holding pawl 41a and link 34 a are released through the transmission slide projections 47a and 48a. In this manner, the link 34a moves into the opening 33a in the retarding mechanism slide 81a, due to the action of spring 38a and the projection 35a. The holding pawl 41a, at the same time, comes to rest with its projection 45a, against the contact projection 22a of the release slide 31. The camera is now prepared for an exposure with the advancing mechanism. Should the release slide 31 now become depressed through the release button, the angled projection 35a of the link 34a first moves as far as the lower edge of the recess 83a of the retarding mechanism slide 81a, in the downward direction, as shown in FIG. 16. At the same time, the stop surface 73 of the stop projection 72 on the tensioning lever 64, becomes placed behind the angled projection 82a of retarding mechanism slide 81a. During further depression of the release member, from this instant of time, the retarding mechanism 81a, is driven by the release slide 31 through the angle projection 35a, by means of the link 34a. The spring 84a is, simultaneously, displaced into tensioned state. The driving pinion 55a is driven, through the cross teeth 80a, at the same time that the free wheel 54a, 55a, shown in FIG. 15a, comes into the position so that the gears of the retarding mechanism are not rotated. After the expiration of the larger portion of the release motion, the inclined surface 37a is brought into contact with the setting eccentric 85a. During further depression of the release member, the link 34a is moved by the angular projection 35a out of the opening 83a in the retarding mechanism slide 81a, shown in FIG. 17, through the inclined surface 37a.

The setting eccentric 85a serves to set or adjust the time instant at which the angled projection 35a leaves the opening 83a, so that it coincides precisely in time with the dropping of the holding pawl 41a behind the stop projection 22a of the release slide 31. When this instant is attained, the retarding mechanism slide 81a returns to its initial or starting position, due to the action of spring 84a. The gears of the retarding mechanism begin, at the same time, to rotate, since the free wheel between the driving gear 55a and the spring 54a, is disengaged in this particular rotational direction. Once the retarding mechanism slide 81a has attained its initial position, after usually 6 to 7 seconds, the stop projection 75a of the tensioning lever 64 passes over the angular projection 82a. The tensioning lever is thereby returned to its initial or starting position, through the spring 79, and at the same time opens the shutter blade 102 through the projection 76. The blade becomes again closed afterward through the spring 107.

Another downward-extending projection 75a, as shown in FIG. 16, can now strike against the blocking projection 45a of the holding pawl 41a, just before the tensioning lever reaches its end position, so that the release slide 31 becomes unlocked and can return to its end position, through the action of spring 40. Such motion, however, involves a certain degree of impact which may cause undesirable shaking or vibration of the camera. For this reason, this feature may also be omitted. Under this condition, the switch on slide 50a would have to be returned briefly to its initial position marked "non-automatic exposure," for a new automatic exposure. Afterwards it must be again brought to the position marked "automatic exposure." This results from the condition that during this motion, the holding pawl 41a is urged into its initial position so that the slide 31 is release, with its locking projection 35a. The slide then returns to its initial position through the action of the spring 40. It is consequently possible to switch immediately the advancing mechanism either on or off, at any desired instant of time.

Figure 19:
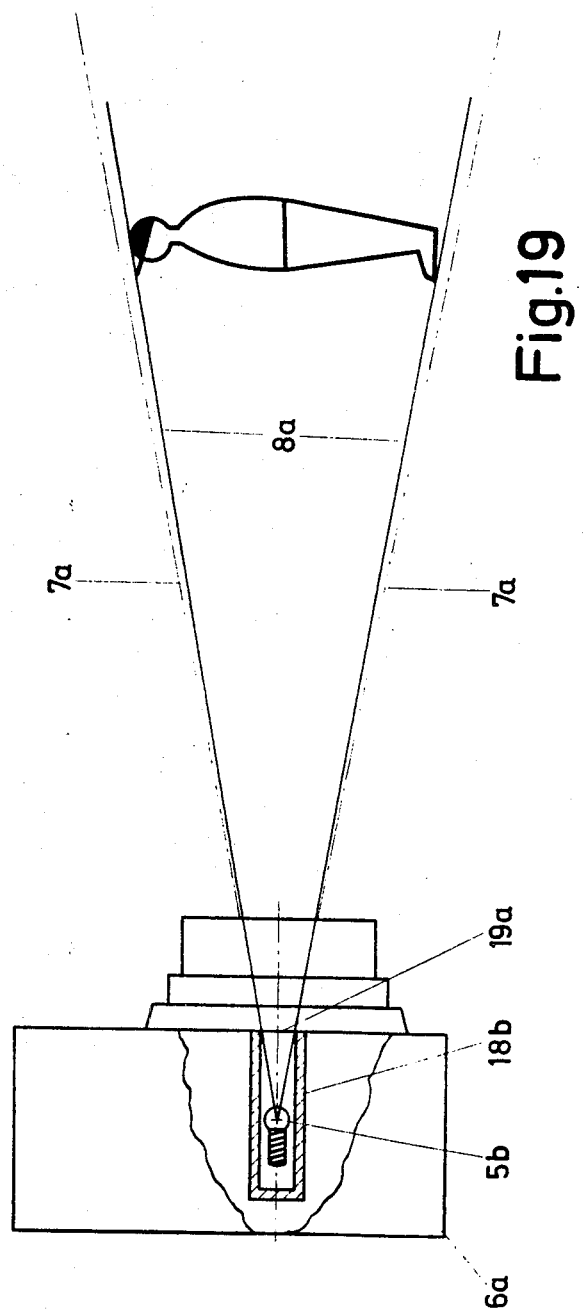
FIG. 19 is an arrangement of the indicator lamp for the monitoring of the exposure angle.

Experience has shown that when exposures are taken with the automatic release device, undesirable results are obtained in the form of "severed heads", "severed legs" and "bisected bodies," for example. This results from the condition that the photographer tends to estimate incorrectly the actual size of the picture area, in reducing the view finder image and taking into account the distance between the camera and the position that he must take after switching on the delayed shutter release. This problem resulting from automatic exposure cameras can be eliminated through a simple and inexpensive accessory, by providing a small conventional lamp 5b in the camera 6a, as shown in FIG. 19. However, unlike the conventional devices, the lamp 5b is located in a tube 18b arranged so that the cone of light 8a of the lamp 5b, which emerges from the opening 19a of the tube, has an angle whereby it substantially coincides with the receiving angle 7a of the objective lens. The person to be photographed and standing in front of the camera, can be certain that he stands within the exposure angle 7a of the objective lens, when he sees the light of lamp 5b.

Figure 18:
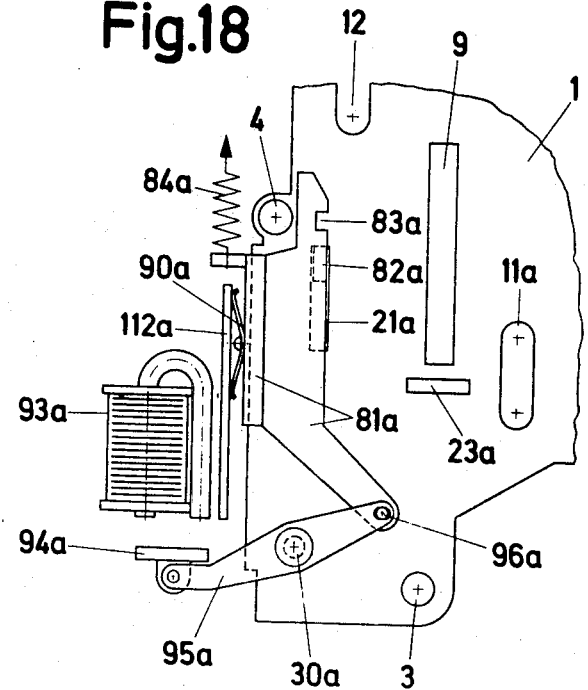
FIG. 18 is a front view of an embodiment comprising an electronic timing mechanism, whilst, in accordance with the present invention, the already existing electronic system of the shutter timing arrangement is used.
Figure 18A:
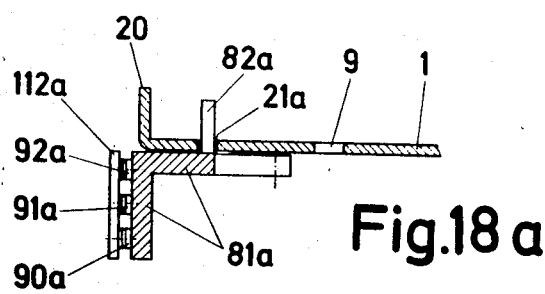
FIG. 18a is a plan view of an embodiment comprising an electronic timing mechanism shown in section.
Figure 18B:
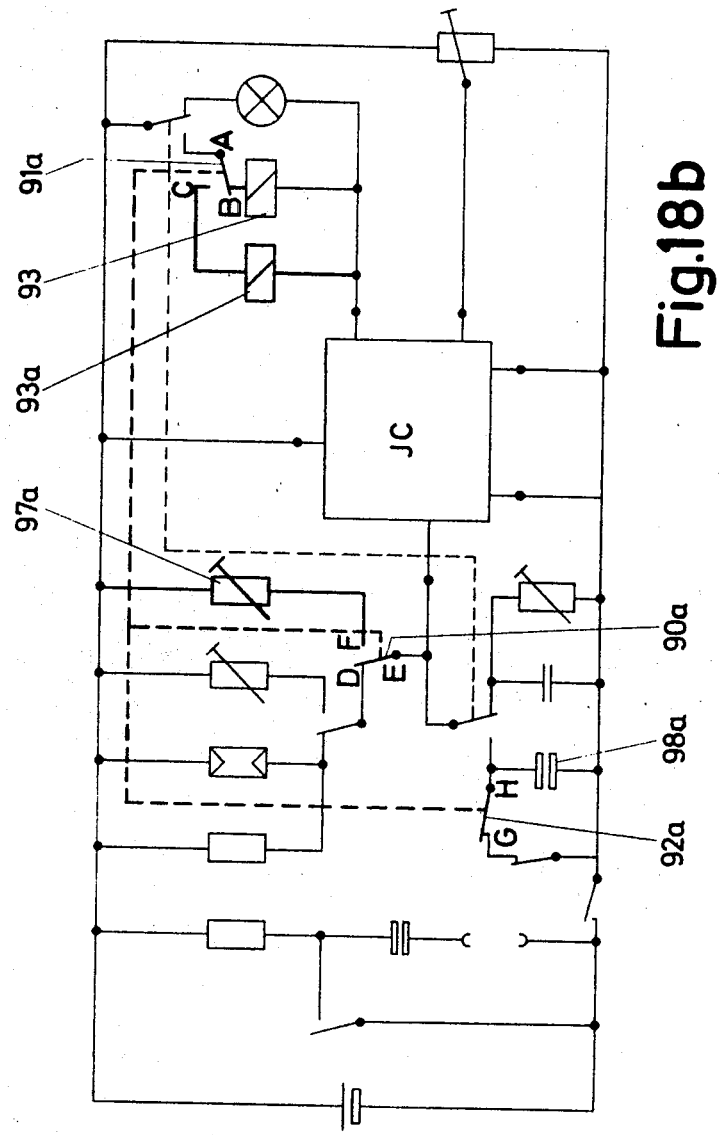
FIG. 18b is the circuit of the embodiment comprising an electronic timing mechanism.

FIGS. 18, 18a and 18b show the construction of the timing mechanism in the form of an electronic retarding mechanism, when used in conjunction with an already existing camera. In accordance with this embodiment, the timing mechanism slide 81a, shown in FIGS. 15 to 17, is preferably made of non-conducting material, such as high grade plastics in the form of acetal resin or the like. The timing mechanism slide 81a, furthermore, carries three sliding contact springs 90a, 91a and 92a, which cooperate with the circuit conductive paths on the board 112. This design takes into consideration the conventional electronic circuit used for controlling the shutter time. In this particular embodiment of the shutter with timing mechanism, it is preferable that the circuit board 112 be arranged parallel to the direction of motion of the stop slide 54, so that it be now vertical, as shown in FIG. 18 and 18a. With this arrangement, a vertically lying circuit board 112a can carry out the switching function through the stop slide 54 as well as through the retarding slide mechanism 81a. As a result, the circuit board can be of integral construction. The retarding mechanism plate 28a and the gears 54a to 58b, as well as the retarding armature 51a, as shown in FIG. 4, are all unnecessary for the electronic timing mechanism. in their place, a retarding mechanism in the form of an electromagnet 93a is provided for cooperating with an armature 94a mounted displacably on a link 95a. The link or lever 95a is journalled to rotate about the threaded rivet 30a, and is coupled to the retarding mechanism slide 81a through a pin and slot connection at the point 96a.

Figure 18C:
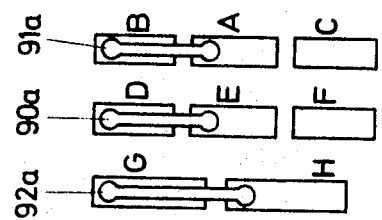
FIG. 18c shows the arrangement of the individual contacts provided with reference letters.

In a modified embodiment, the retarding mechanism with the holding magnet 93a can also be directly mounted below the slide 81a, shown in FIG. 18a. In this manner the armature 94a secured to the retarding mechanism slide 81a is moved directly into the operative range or field of the magnet 93a. The slide spring contacts 90a, 91a, and 92a are inserted into the conventional circuit for controlling the electronic shutter timing mechanism shown in FIGS. 18a to 18c, in accordance with the present invention. The individual spring contacts 90a, 91a, 92a are designated by the letters A-H.

In the operation of the electronic retarding mechanism, the slide 81a is not driven by the link 34a when the timing mechanism of the camera is not switched on, so that it remains in the inoperative position shown in FIG. 15. Under this condition, the switch G-H, formed from the contacts 92a, remains closed. The switch D-E-F comprising the switching contact 90a, remains in the inoperative position. In this inoperative state, the contacts E-B are in contact, and the switch A-B-C formed through contacts 91a, maintains the circuit connection A-B closed. The shutter holding magnet 95 for the timing control is, thereby, also connected to the electronic circuits. However, if the automatic exposure switch on slide 50a is actuated so that the timing mechanism is switched on, then the retarding mechanism slide 81a is operated when the release button is depressed. The switching springs 90a, 91a, and 92a are, at the same time, moved on the circuit board 112a, relative to the contact point A-H. After After traveling or moving approximately halfway, the contact springs 90a and 91a transfer from the contact E-D to E-F and A-B to A-C, shown in FIG. 18c. A regulating resistor 97a for setting the timing is, thereby, connected to the circuit on one hand, and the retarding mechanism holding magnet 93a, is connected into the circuit on the other hand. The switch G-H in the form of contact 92a, is first held closed, whereby the capacitor 98 a, provided in the circuit for the shutter timing, remains discharged. The switching path H is arranged so that the spring contact 92a leaves this path at the moment when the link 34a becomes disengaged from the retarding mechanism slide 81a by the eccentric rivet 85a and the inclined surface 37a. From that instant of time, the discharge of the capacitor 98a commences through the regulating resistor 97a.

The voltage at the input of the monostable multivibrator then rises until the electronic circuit allows the holding magnet 93a to become deenergized. After such deenergizing of the magnet 93a, the armature 94a is released, and the slide 81a is returned to its initial position, through the action of the spring 84a. The angular projection 92a, at the same time, release the stop projection 72 of the tensioning lever 64, and thereby permits its return. The tensioning lever 64, at the same time, actuates the shutter blade 102 with its operative projection 76. During the return of the retarding mechanism slide 81a, the switch configuration necessary for the shutter timing is again established through the contact springs 90a, 91a, and 92. Thus, the discharge of the capacitor 98a takes place through the switch H–G. In this manner, the electronic circuit is prepared again for the shutter timing, when the angular projection 82a has attained its end position. With the present invention, therefore, the comparatively expensive electronic components of the shutter timing control are also used for establishing the initial running time of an automatic exposure mechanism, in a particularly economical manner.

While the invention has been described and illustrated with respect to certain preferred examples which give satisfactory results, it will be understood by those skilled in the art after understanding the principle of the invention that various changes and modifications may be made without departing from the spirit and scope of the invention.

What is claimed is:

1. A photographic camera having a shutter with timing mechanism controlling said shutter for automatic exposures comprising, in combination, film means having a perforation per frame; stop slide means for sensing said perforation in said film means; circuit board means with conductive paths arranged parallel to the motion of said stop slide means; contact means connected to said stop slide and contacting said conductive paths on said circuit board means; operation selecting means for selecting the operational state of said camera and linked to said stop slide for moving said contact means against said predetermined ones of said conductive paths dependent upon the selected operational state of said camera; retarding mechanism slide means with retaining projection for operation during automatic exposure; tension lever means cooperating with said retaining projection; link means cooperating with said retarding mechanism slide means so that said retaining projection follows the release movement of said shutter; release slide means operative during said release movement; pawl means engaging said slide means and locking said slide means in place at the end of said release movement, said retaining projection following said release movement through said link means and moving out of initial operative position to an end position at the end of said release movement; timing means for delaying by a predetermined interval the return of said retaining projection to said initial position after having reached said end position, said retaining projection releasing said tension lever means upon return to said initial position for releasing said camera after said predetermined interval of time.

2. The camera as defined in claim 1 including electrically operated switching devices connected to said circuit board means and switched to operative state when said timing means becomes operative, said devices being switched to inoperative state when said timing means becomes inoperative at the end of said predetermined time interval.

3. The camera as defined in claim 1 including a transmission member for moving said link means in and out of engagement with said timing means, said transmission member moving also said pawl means in and out of engagement with said release slide means.

4. The camera as defined in claim 1 including a timing mechanism slide in said timing means; electromagnet means for retaining said timing mechanism slide in place after reaching its lowest position during the motion of said mechanism slide, said electromagnet releasing said timing mechanism slide after expiration of said predetermined time interval for releasing said camera.

5. The camera as defined in claim 1 including a panel member for guiding said release slide means; means for rotatably mounting said tension lever on said release slide means; a stop projection engaged by said tension lever in inoperative positions; spring means for moving said tension lever against said stop projection; an actuating lug on said tension lever, said tension lever being of plastic material; feed pins cooperating with said actuating lug; an intermediate gear for holding said feed pins; a driving peg for said actuating lug; a transmission lever with pocket engaged by said driving peg; a lever arm for supporting said transmission lever at one end, said driving peg engaging said pocket during the last portion of angular movement of said tension lever; a second actuating lug on said tension lever; a stop projection on said second actuating lug; a stationary stop angle on said panel member so that said stop projections on said second actuating lug moves into proximity of said stationary stop angle due to angular motion of said tension lever, whereby during downward movement of said release slide means and said tension lever means, said projection on said second actuating lug becomes placed against said stationary stop angle on said panel member, said tension lever means remaining in tensioned position through said spring means and moving with its first-mentioned actuating lug out of the path of motion of said feed pins during release of said camera.

6. The camera as defined in claim 5 including an auxiliary lever arm; an armature lever turned by said auxiliary lever arm; spring means connected to said armature lever, said armature lever being turned by said auxiliary lever arm; spring means connected to said armature lever, said armature lever being turned by said auxiliary lever arm against the action of said last-mentioned spring, said tension lever means when moving downward with said release slide means during the release of said camera, swinging said transmission lever through said driving peg in said transmission lever pocket and turning simultaneously said armature lever through said auxiliary lever arm; electromagnet means; an armature plate cooperating with said armature lever for pressing said armature lever against said electromagnet through said armature plate; a control cam on said transmission lever arm; a contact spring actuated by said control cam and secured to said circuit board means for executing a switching operation during turning of said armature lever; an auxiliary pawl mounted concentrically with said armature lever on said panel member, said auxiliary pawl being pressed against an angled edge of said armature lever; auxiliary contact spring means secured to said circuit board means and actuated by said auxiliary pawl for executing a switching operation.

7. The camera as defined in claim 6 including a capacitor short circuited through said contact spring.

8. The camera as defined in claim 1 including a guide arm on said stop slide means; a panel member with opening for guiding said guide arm, said stop slide means being of plastic material; sensing finger means on said stop slide means for sensing said perforations in said film; a locking projection on said guide arm, said tension lever means locking said stop slide means in initial position through said locking projection; and at least one contact spring on said stop slide means and cooperating with said circuit board means.

9. The camera as defined in claim 1 including flashcube holder means; film feed wheel means for advancing said film; integral gear means mounted integral with said film feed wheel means; intermediate gear means for interconnecting said flashcube holder means and said film feed wheel means; feed pins uniformly arranged on said intermediate gear; and an actuating lug on said tension lever means, said feed pins extending into the path of motion of said actuating lug and cooperating with said actuating lug.

10. The camera as defined in claim 9 including a contact surface portion on said tension lever means; a stationary stop member struck by said tension lever means through said contact surface portion only when said flash cube holder means has completed an angular rotational motion of 90°.

11. The camera as defined in claim 9 including friction clutch means between said film feed wheel means and said intermediate gear.

12. The camera as defined in claim 5 including a locking surface portion on said tension lever means; a projection on said stop slide means engaged by said locking surface portion for locking said stop slide means in place at the end of the release movement of said camera, said stop angle releasing said tension lever means whereby said lever means moves into position for engaging said projection through said locking surface; an actuating projection on said tension lever means; shutter blade means with stop projection and pivotable about an axis for uncovering a shutter opening, said actuating projection striking against said stop projection on said shutter blade means and uncovering said shutter opening during return of said tension lever means; a locking projection; an arm on said tension lever means moved into proximity of said locking projection for retaining said shutter blade means in open position whereby said shutter opening is uncovered; electromagnet means; armature lever means cooperating with said electromagnet means for holding said shutter blade means in said open position until said electromagnet means releases said armature lever for return to its inoperative position whereby said shutter blade means is returned to its initial closed position for covering against said shutter opening.

13. The camera as defined in claim 1 including a panel member with a U-shaped space for retaining said circuit board means parallel to the direction of motion of said stop slide means when sensing the edge of said film means; spring contact means mounted on said circuit board means; lever means pivotably mounted on said panel member, said spring contact means being angled so that they extend with their ends into the path of motion of said lever means on said panel member, said spring contact means being actuated so that said angled portions of said spring contact means engage said circuit board means through operation of said lever means.

14. The camera as defined in claim 1 including shutter blade means; a lever arm on said shutter blade means; locking pawl means cooperating with said lever arm for engaging said shutter blade means in the locking position of said locking pawl means; a stop projection on said shutter blade means; and an actuating projection on said tension lever means cooperating with said stop projection on said shutter blade means.

15. The camera as defined in claim 1 including a transmission member; an automatic exposure switch member; and an indicator pin connected to one of said members and projecting out of said camera for indicating when said timing means is operative.

16. The camera as defined in claim 15 including a view finder; and means within said viewfinder for indicating through said indicator pin that said camera is in automatic exposure operating state.

17. The camera as defined in claim 1 including lamp means radiating light when said timing means in in operative state; means for directing said light from said lamp means in a cone-shaped beam so that the angle of dispersion of said light coincides with the exposure angle of the objective lens of said camera, whereby said lamp means is seen only from a position within said exposure angle of said objective lens of said camera.

18. The camera as defined in claim 17 including means for adapting the angle of dispersion of said cone of light in longitudinal axis to varying exposure angles of said objective lens.

19. The camera as defined in claim 1 including means with iris diaphragm markings for exposures of single persons; means for directing a ray of light at the center of the picture and having a small aperture angle; and means for producing a narrow beam of light at eye level over the width of the exposure angle for taking group exposure.

* * * * *